United States Patent Office 2,795,582
Patented June 11, 1957

2,795,582

QUINOPHTHALONE DYES FOR HYDROPHOBIC FIBERS

Albert Webb Bauer, Wilmington, Del., and Clarence Forest Belcher, Bridgeton, N. J., assignors to E. I. du Pont de Nemours and Company, Wilmington, Del., a corporation of Delaware No Drawing. Application July 25, 1956,
Serial No. 599,937

5 Claims. (Cl. 260—247.5)

This invention relates to novel dyes of the quinophthalone series.

It is an object of this invention to provide novel compounds of the quinophthalone series which are useful as cationic dyes (basic dyes) for hydrophobic fiber containing nitrogen in its structure, such as nylon or polyacrylonitrile fiber. A further object of this invention is to provide a process or processes for the preparation of said cationic dyes. A still further object is to prepare novel compounds which may serve as intermediates for said cationic dyes, and which, furthermore, can be used themselves as disperse dyes for various hydrophobic fibers such as nylon, cellulose acetate, polyacrylonitrile fiber and polyethylene terephthalate fiber. A still further object is to provide new yellow colors for hydrophobic fiber, there having been hitherto a particular shortage of satisfactory dyes of this shade for hydrophobic fiber. Various other objects and achievements of this invention will become apparent as the description proceeds.

According to this invention, these objects are achieved by reacting first a nitro quinophthalone compound of the formula

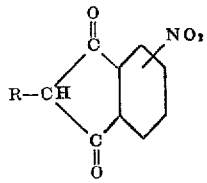

wherein R stands for a 3-hydroxyquinolyl radical such as 3-hydroxyquinolyl itself or its Bz chlorine, bromine or methyl derivatives, with a monotertiary alkylene diamine of the formula

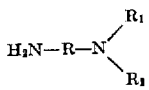

wherein R is an alkylene radical of 2 to 10 C-atoms, while the group

represents a nitrogenous base radical of the group consisting of dialkyl amines, monoalkyl-monohydroxyalkyl amines, di(hydroxyalkyl) amines, piperidine and morpholine, the alkyl radicals contained in said group

having not more than 4 C-atoms each.

Reaction is preferably effected in an inert solvent and in the presence of an organic acid absorbing agent, such as sodium acetate or dimethyl aniline.

The resulting condensation products correspond to the formula

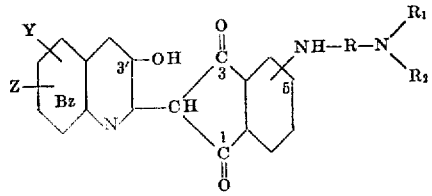

wherein the group

has the same significance as above, while Y and Z may designate hydrogen, chlorine, bromine or methyl.

Inasmuch, however, as tautomerism is a natural possibility for the amino quinophthalone radical, for instance, the arrangement

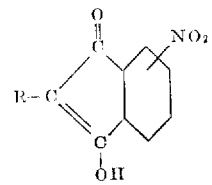

wherein R stands for the hydroxyquinolyl radical and its Bz-substitution derivatives, that is the radical

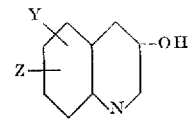

as above defined, it is better to represent said novel condensation products by the general formula

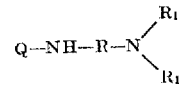

wherein Q represents the nucleus of a 3′-hydroxyquinophthalone in any of its tautomeric forms, and wherein the NH-radical is attached to the Bz-ring of the phthaloyl portion of the quinophthalone nucleus.

The resulting condensation products are then reacted with quaternizing agents such as alkyl halides, sulfates, phosphates or aryl-sulfonates, aralkyl halides, or, in general, compounds of formula R₃X, wherein R₃ is alkyl, hydroxyalkyl or aralkyl, while X is the anion of a water-soluble acid. As typical illustrations of such quaternizing agents may be mentioned dimethyl sulfate, diethyl sulfate, triethyl phosphate, tri(n-propyl) phosphate, methyl iodide, ethyl bromide, methyl p-toluene sulfonate and benzyl chloride.

The resulting cationic compounds may be isolated as such or as zinc chloride double salts. In either form, they may be used as basic dyes for wool, but their special interest resides in their capacity to dye nitrogenous hydrophobic fiber, such as nylon or "Orlon" polyacrylonitrile fiber, in strong yellow shades of good fastness qualities. Our novel compounds are stable to hydrolysis in mildly alkaline dye baths, and therefore may be applied to said hydrophobic fibers from acid, neutral or alkaline dye baths.

Our novel cationic dyes may also be prepared by a reversal of the two principal reactions; that is, the monotertiary alkylene diamine may be quaternized first (with an agent and in the manner above indicated), and the resulting monoquaternary alkylene diamine of the formula

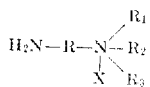

(wherein R, $R_1$, $R_2$, $R_3$ and X have the same significance as above), may then be reacted with a nitroquinophthalone compound of the formula above set forth.

Our novel cationic dyes may also be prepared by starting with an amino 3'-hydroxyquinophthalone (generally obtained by reduction of the nitro compound hereinabove discussed); reacting this with an alkylene dihalide of the formula Y—R—X, wherein R is an alkylene radical of 2 to 10 C-atoms while X and Y represent halogen atoms, particularly Cl or Br, to obtain an intermediate of formula

Q—NH—R—X wherein Q, R and X have the same significance as above. The latter may then be condensed with a nitrogenous base of the formula

wherein $R_3$ is lower alkyl, hydroxyalkyl or aralkyl while

is the radical of a lower dialkyl amine, monoalkylmonohydroxyalkyl amine, di(hydroxyalkyl) amine, piperidine or morpholine.

Our novel cationic dyes may also be prepared by reacting an amino 3'-hydroxyquinophthalone directly with a halogeno alkylene quarternary compound of the formula

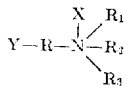

wherein the symbols have the same significance as above.

The intermediate tertiary bases and halogeno compounds obtained above, that is the compounds of the formulas

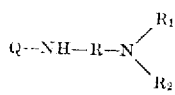

and

Q—NH—R—X as above defined, themselves possess valuable tinctorial qualities and are suitable for use directly as disperse dyes for various hydrophobic fibers, such as nylon, cellulose acetate, polyacrylonitrile fiber and polyethylene terephthalate fiber. For such purposes, they may be applied in the form of solutions or dispersions from aqueous baths in customary manner, the bath usually containing soap or other dispersing agents and optional auxiliary agents.

Without limiting this invention, the following examples are given to illustrate my preferred mode of operation. Parts mentioned are by weight.

EXAMPLE 1

4-(3-trimethylammonio-propylamino)-3'-hydroxyquinophthalone methyl sulfate 15 parts of 4-nitro-3'-hydroxyquinophthalone, 4.1 parts of sodium acetate, 10 parts of N,N-dimethyl-1,3-propanediamine and 145 parts of nitrobenzene are mixed and agitated at 130° C. for 16 hours. At the end of this period excess N,N-dimethyl-1,3-propanediamine is distilled off, and the mixture is allowed to cool to room temperature. Dimethylsulfate (6.5 parts) is added to the flask, and it is heated at 50° to 55° C. for two hours. The crude quarternized product is filtered with the mixture and dried.

The solid is dissolved into 1000 parts of 0.1% acetic acid. This solution is stirred at 90° C. for 30 minutes and then filtered hot. The filtrate is cooled to 5° C. Slowly, 5 parts of zinc chloride and 100 parts of sodium chloride are added to the solution. The mixture is stirred for one hour at 5° C., and then the purified product is filtered off and dried at 65° C.

The product is freely soluble in water, and dyes "Orlon" acrylic fiber from an aqueous bath in yellow shades, fast to washing and crocking. When the color is applied from a weakly acidic, aqueous bath to a mixed fabric containing hydrophobic fibers and wool, the latter is not stained.

EXAMPLE 2

4-(3-dimethylaminopropylamino)-3'-hydroxyquinophthalone

The procedure of Example 1 is repeated up to and including the step of distilling off the excess N,N-dimethyl-1,3-propanediamine. The mixture is then cooled to room temperature, and concentrated hydrochloric acid is added with thoorugh mixing until pH 2 to 3 is reached. After stirring for 0.5 hour, the mixture is filtered, and the filter cake is dried at 65° C. The crude product thus obtained is dissolved into 1000 parts of hot (80° to 90° C.) water for purification. This solution is adjusted to pH 2 to 3 with hydrochloric acid, stirred at 80° to 90° C. for one hour, and filtered. The residue is discarded. Sodium hydroxide is added to the filtrate to obtain a pH of 12 to 13. The purified product is filtered off, washed with 25 parts of water, and dried at 65° C.

The tertiary amino compound thus obtained may be applied to "Orlon" acrylic filer from an acidic aqueous dye bath, in which it is soluble. The resulting bright yellow dyeing is fast to washing and crocking.

EXAMPLE 3

The procedure is the same as in Examples 1 and 2, except that in lieu of 15 parts of 4-nitro-3'-hydroxyquinophthalone therein named, a stoichiometrically equivalent quantity of any of the following quinophthalones is used:

(a) 4-nitro-6',8'-dibromo-3'-hydroxyquinophthalone
(b) 4-nitro-6'-bromo-3'-hydroxyquinophthalone
(c) 4-nitro-6',8'-dichloro-3'-hydroxyquinophthalone
(d) 4-nitro-7'-chloro-8'-methyl-3'-hydroxyquinophthalone
(e) The 5-nitro-analogs of (a) to (d)

The results in each case are similar to those obtained in Examples 1 and 2 above.

EXAMPLE 4

(a) 4-(2-bromoethylamino)-3'-hydroxyquinophthalone 52 parts of orthodichlorobenzene, 21.8 parts of 1,2-dibromoethane and 5 parts of 4-amino-3'-hydroxyquinophthalone are mixed and refluxed for 16 hours. The mixture is cooled to 10° C., diluted with 70 parts of petroleum hydrocarbons (boiling range 45° to 60° C.), and filtered. The press cake is washed with 35 parts of the petroleum hydrocarbons and then dried at 100° C.

(b) 4-(2-triethylammonio-ethylamino)-3'-hydroxyquinophthalone halide 5 parts of 4-(2-bromoethylamino)-3'-hydroxyquinophthalone (obtained in part a), 77 parts of monochlorobenzene, and 22 parts of triethylamine are mixed and stirred at 90° to 95° C. for 20 hours. The mixture is filtered hot, and the cake is dried at 65° C.

The dry press cake is placed into 500 parts of water with 2 parts of glacial acetic acid. This slurry is heated to 100° C. and stirred for 10 minutes. It is filtered hot, and the cake washed with 10 parts of water. Zinc chloride (1 part) is added to the filtrate and the combined washings, and the solution is cooled to 5° C. Salt (50 parts) is slowly dissolved into the mixture with stirring. It is allowed to stand overnight at room temperature and then is filtered. The product is dried at 65° C.

The product dissolves readily in water and dyes "Orlon" acrylic fiber in yellow shades, fast to washing, crocking and light. It does not stain wool when applied to a mixed fabric from a weakly acidic bath.

EXAMPLE 5

*4-(3-trimethylammonio-propylamino)-3'-hydroxyquinophthalone halide, zinc chloride double salt*

3.0 parts of 4-amino-3'-hydroxyquinophthalone, 5.2 parts of 3-bromopropyl trimethylammonium bromide, 4.7 parts of N,N-diethylaniline and 45 parts of 2-methoxyethanol-1 are mixed and refluxed for 16 hours. The mixture is drowned into 200 parts of water. This slurry slowly is heated to 90° C. and then filtered. Two parts of zinc chloride are dissolved into the filtrate, which is then allowed to cool to room temperature. With stirring, 25 parts of sodium chloride slowly are added to the dye solution. After the salted solution has been stirred for 2 hours, the product has precipitated out. The liquor is decanted from the beaker, leaving the dye behind. The product is dried at 100° C. It dyes "Orlon" acrylic fiber bright greenish-yellow shades possessing good fastness.

It will be understood that the details of the above examples are susceptible of wide variation, without departing from the spirit of this invention. Thus, in lieu of N,N-dimethyl-1,3-propanediamine in Examples 1 and 2, any of the following may be used:

N,N-dimethyl-1,1-dimethyl-ethylene diamine
N,N-diethanol-1,4-butane diamine
N,N-dimethyl-decamethylene diamine
N-methyl-N-betahydroxypropyl-1,3-propane diamine
N,N-di-n-butyl-ethylene diamine
N-(betaaminoethyl)-morpholine
N-(betaaminoethyl)-piperidine In lieu of dimethyl sulfate in Example 1, any other of the quaternizing agents above named may be used.

In lieu of triethylamine in Example 4, any of the following may be used: butyl dimethylamine, tripropylamine, p-methylbenzyldimethylamine, 2-phenylethyldimethylamine, ethyldiethanolamine or other tertiary bases within the general class above indicated.

As solvents or diluents in the quaternization reactions, any inert organic liquid which enables attaining the preferred temperature of reaction may be employed, for instance nitrobenzene, o-dichlorobenzene, trichlorobenzene, the xylenes, ethylene glycol, and the lower monoalkyl ethers (1 to 4 C-atoms) of ethylene glycol and of diethylene glycol.

In the condensation reactions, likewise, considerable variation in the choice of solvents is permissible within the limitations that the solvent shall be inert and shall enable attainment of the desired reaction temperature.

The temperatures of the various reactions may be varied widely, but the following ranges are preferred:

For the condensation of an amino-hydroxyquinophthalone with an alkylene dihalide (as in Example 4a); or of a nitrohydroxyquinophthalone with a monotertiary alkylene diamine (Example 1): 70° to 200° C.

For a condensation of the type illustrated in Example 5: 70° to 140° C.

For a quaternization reaction as illustrated in Example 1: 20° to 100° C.

For a condensation as typified by Example 4(b) 90° to 140° C.

Acid-absorbing agents (in the condensation step) are not essential, but may be used, if desired. Convenient agents for this purpose are N,N-dimethyl aniline, N,N-diethyl aniline, N,N-di-betahydroxyethyl aniline, and sodium carbonate.

Many other variations and modifications will be readily apparent to those skilled in the art.

As concerns the nitro-and amino-3'-hydroxyquinophthalones used as initial materials in the above examples, these are themselves novel compounds and are described more fully and claimed in copending application of F. Zwilgmeyer, Serial No. 567,091, filed February 23, 1956.

We claim as our invention:

1. A compound of the group consisting of the quaternary ammonium salts of the formula

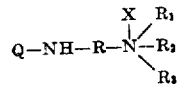

and the zinc chloride double salts thereof, Q in said formula representing the nucleus of a 3'-hydroxyquinophthalone to which the NH radical above shown is attached in the Bz ring of the phthaloyl radical; R being an alkylene radical of 2 to 10 C-atoms; $R_3$ representing a substituent of the group consisting of alkyl, hydroxyalkyl and aralkyl; X representing the anion of a water-soluble acid; and the group

being a nitrogenous base radical selected from the group consisting of dialkyl amines, monoalkyl-monohydroxyalkyl amines, di(hydroxyalkyl) amines, piperidine and morpholine; all the alkyls in said members $R_1$, $R_2$ and $R_3$ being alkyls of not more than 4 C-atoms each.

2. The process of producing a compound as defined in claim 1, which comprises reacting a nitro-3'-hydroxyquinophthalone of the formula

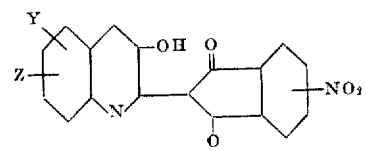

wherein Y and Z represent members of the group consisting of hydrogen, chlorine, bromine and methyl, with an alkylene diamine of the formula

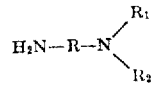

wherein R is an alkylene radical of 2 to 10 C-atoms, while the group

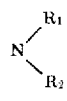

represents a nitrogenous base radical of the group consisting of dialkyl amines, monoalkyl-monohydroxyalkyl amines, di(hydroxyalkyl) amines, piperidine and morpholine, the alkyl radicals contained in said group

having not more than 4 C-atoms each, and quaternizing the resulting tertiary base.

3. A process as in claim 2, the quaternizing agent being dimethyl sulfate, and the product being recovered in the form of its zinc-chloride double salt.

4. A quinophthalone compound of the formula

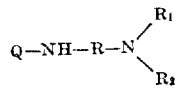

wherein Q represents the nucleus of a 3'-hydroxyquinophthalone bearing the radical

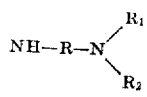

in the Bz ring of the phthaloyl radical, R is an alkylene radical of 2 to 10 C-atoms, while the group

represents a nitrogenous base radical of the group consisting dialkyl amines, monoalkyl - monohydroxyalkyl amines, di(hydroxyalkyl) amines, piperidine and morpholine, all alkyl radicals named in conjunction with said group

having not more than 4 C-atoms each.

5. The process of producing a quinophthalone compound as defined in claim 4, which comprises reacting a nitro-3'-hydroxyquinophthalone of the formula

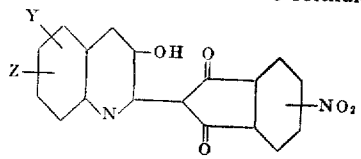

wherein Y and Z represent members of the group consisting of hydrogen, chlorine, bromine and methyl, with an alkylene diamine of the formula

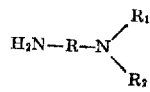

wherein R is an alkylene radical of 2 to 10 C-atoms, while the group

represents a nitrogenous base radical of the group consisting of dialkyl amines, monoalkyl-monohydroxyalkyl amines, di(hydroxyalkyl) amines, piperidine and morpholine, the alkyl radicals contained in said group

having not more than 4 C-atoms each, recovering the reaction product in the form of an inorganic acid salt thereof, and treating the latter with alkali to regenerate the tertiary base.

No references cited.

UNITED STATES PATENT OFFICE

CERTIFICATE OF CORRECTION

Patent No. 2,795,582                                                  June 11, 1957

Albert Webb Bauer et al.

It is hereby certified that error appears in the printed specification of the above numbered patent requiring correction and that the said Letters Patent should read as corrected below.

Column 2, lines 41 to 45, the formula should appear as shown below instead of as in the patent—

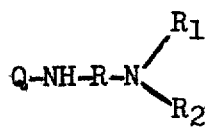

column 4, line 1, for "with the" read --from the--; line 23, for "thoorugh" read --thorough--.

Signed and sealed this 6th day of August 1957.

(SEAL)
Attest:

KARL H. AXLINE

Attesting Officer

ROBERT C. WATSON
Commissioner of Patents